United States Patent
Kawa et al.

(10) Patent No.: US 9,462,070 B2
(45) Date of Patent: Oct. 4, 2016

(54) PROTECTING PRIVACY IN GROUP COMMUNICATIONS

(75) Inventors: Claude Kawa, Montreal (CA); Gwenael Le Bodic, Montreal (CA); Jean Regnier, Montreal (CA)

(73) Assignee: Synchronica plc, Kent (GB)

( * ) Notice: Subject to any disclaimer, the term of this patent is extended or adjusted under 35 U.S.C. 154(b) by 9 days.

(21) Appl. No.: 11/853,258

(22) Filed: Sep. 11, 2007

(65) Prior Publication Data

US 2008/0120374 A1    May 22, 2008

Related U.S. Application Data

(60) Provisional application No. 60/859,678, filed on Nov. 17, 2006.

(51) Int. Cl.
| | |
|---|---|
| G06F 15/16 | (2006.01) |
| H04L 29/08 | (2006.01) |
| H04L 12/58 | (2006.01) |
| H04W 12/02 | (2009.01) |
| G06Q 10/10 | (2012.01) |
| H04L 29/06 | (2006.01) |

(52) U.S. Cl.
CPC ............ *H04L 67/24* (2013.01); *H04L 12/5815* (2013.01); *H04L 51/043* (2013.01); *H04L 63/104* (2013.01); *H04W 12/02* (2013.01); *G06Q 10/10* (2013.01); *H04L 12/581* (2013.01); *H04L 29/06176* (2013.01); *H04L 29/08081* (2013.01); *H04L 51/04* (2013.01); *H04L 63/0414* (2013.01)

(58) Field of Classification Search
CPC ................. H04L 67/24; H04L 63/104; H04L 29/08081; H04L 29/06176; H04L 51/043; H04L 51/04; H04L 12/02; H04L 12/581; H04L 12/043; G06Q 10/10; H04W 12/02
USPC .......................................................... 709/204
See application file for complete search history.

(56) References Cited

U.S. PATENT DOCUMENTS

| | | | | |
|---|---|---|---|---|
| 5,897,635 | A * | 4/1999 | Torres et al. | 707/10 |
| 6,154,764 | A * | 11/2000 | Nitta et al. | 709/200 |
| 6,256,663 | B1 * | 7/2001 | Davis | 709/204 |
| 6,697,840 | B1 * | 2/2004 | Godefroid | H04L 29/06 709/204 |
| 6,964,012 | B1 * | 11/2005 | Zirngibl et al. | 715/201 |
| 6,970,070 | B2 * | 11/2005 | Juels et al. | 340/10.1 |
| 7,483,969 | B2 * | 1/2009 | Chavda | G06Q 10/107 709/203 |

(Continued)

OTHER PUBLICATIONS

IBM; Instant Messaging Controls and Indicators; Nov. 19, 2004; ip.com; 3 Pages.*

(Continued)

*Primary Examiner* — Krista Zele
*Assistant Examiner* — Anthony Fabbri
(74) *Attorney, Agent, or Firm* — Soquel Group LLC

(57) ABSTRACT

Methods and systems for protecting the privacy of a user of a communication system that include enabling a first user to block a second user so that the first user generally appears to the second user to be unavailable. The method includes allowing a third user to establish a group that includes the first user and the second user. The group may be any sort of group that involves communication among three or more users. For example, the group may be an instant message group, voice chat, conference call, video conference, or any other suitable group communication. The method also enables a blocked user to be temporarily unblocked so as to prevent his blocking decision to be revealed to the blocked user.

12 Claims, 3 Drawing Sheets

(56) References Cited

U.S. PATENT DOCUMENTS

| | | | |
|---|---|---|---|
| 7,606,862 B2* | 10/2009 | Swearingen | H04L 51/04 709/204 |
| 7,620,902 B2* | 11/2009 | Manion et al. | 715/758 |
| 7,966,369 B1* | 6/2011 | Briere | G06Q 10/10 707/616 |
| 8,103,300 B2 | 1/2012 | Gogic | 455/519 |
| 8,224,900 B2* | 7/2012 | Dutta | G06F 15/16 370/352 |
| 8,391,909 B2* | 3/2013 | Stewart | 455/518 |
| 8,639,755 B2* | 1/2014 | Kogan | H04L 67/24 709/204 |
| 2002/0073150 A1* | 6/2002 | Wilcock | G06Q 10/10 709/204 |
| 2002/0138588 A1* | 9/2002 | Leeds | 709/217 |
| 2002/0156787 A1* | 10/2002 | Jameson | G06Q 10/06 |
| 2004/0057449 A1* | 3/2004 | Black | 370/432 |
| 2004/0073621 A1* | 4/2004 | Sampson | 709/209 |
| 2004/0073643 A1* | 4/2004 | Hayes et al. | 709/223 |
| 2004/0161090 A1* | 8/2004 | Digate | H04L 12/581 379/202.01 |
| 2005/0117570 A1* | 6/2005 | Cetusic et al. | 370/352 |
| 2005/0153724 A1* | 7/2005 | Vij et al. | 455/518 |
| 2005/0153754 A1* | 7/2005 | Shanks et al. | 455/575.5 |
| 2005/0172001 A1* | 8/2005 | Zaner et al. | 709/205 |
| 2006/0015566 A1* | 1/2006 | Sampson | 709/206 |
| 2006/0022048 A1* | 2/2006 | Johnson | 235/462.1 |
| 2006/0041844 A1* | 2/2006 | Homiller | H04L 12/581 715/734 |
| 2006/0123082 A1* | 6/2006 | Digate | G06Q 10/107 709/205 |
| 2006/0210034 A1* | 9/2006 | Beadle et al. | 379/88.22 |
| 2006/0234735 A1* | 10/2006 | Digate | H04L 12/581 455/466 |
| 2007/0067387 A1* | 3/2007 | Jain et al. | 709/204 |
| 2007/0124381 A1* | 5/2007 | Zurko | G06Q 10/10 709/205 |
| 2007/0198725 A1* | 8/2007 | Morris | 709/227 |
| 2007/0237096 A1* | 10/2007 | Vengroff et al. | 370/254 |
| 2008/0091786 A1* | 4/2008 | Jhanji | 709/206 |
| 2008/0155080 A1* | 6/2008 | Marlow et al. | 709/223 |
| 2008/0167005 A1* | 7/2008 | Gilzean | G06Q 10/10 455/412.2 |
| 2008/0205295 A1* | 8/2008 | Saba | H04L 67/02 370/254 |
| 2008/0226050 A1* | 9/2008 | Leppisaari | G06Q 10/10 379/202.01 |
| 2009/0019367 A1* | 1/2009 | Cavagnari | G06F 21/62 715/716 |
| 2010/0095109 A1* | 4/2010 | McColgan | H04L 29/08081 713/151 |
| 2010/0180211 A1* | 7/2010 | Boyd | G06Q 10/109 715/751 |
| 2011/0161130 A1* | 6/2011 | Whalin | G06Q 10/10 705/7.18 |
| 2011/0276396 A1* | 11/2011 | Rathod | G06F 17/30867 705/14.49 |
| 2012/0290950 A1* | 11/2012 | Rapaport | H04L 51/32 715/753 |

OTHER PUBLICATIONS

"WV-041 Features and Functions," [online], Approved Version 1.2, Jan. 2005, Open Mobile Alliance, OMA-IMPS-WV-Features-FUnctions-V1_2-20050125-A, [retrieved Jul. 7, 2008], Retrieved from the Internet: <http://www.openmobilealliance.org/Technical/release_program/imps_v1_2_1.aspx>, pp. 1-23.

International Search Report for corresponding PCT Application No. PCT/CA2007/001642, mailed Nov. 28, 2007, 4 pages.

Written Opinion for corresponding PCT Application No. PCT/CA2007/001642, mailed Nov. 28, 2007, 8 pages.

Dersingh et al. "Managing access control for presence-based services," Proceedings of the 3rd Annual Communication Networks and Services Research Conference, May 16-18, 2005, pp. 105-111.

Chinese Office action for corresponding CN application No. 200780045207.9 dated Mar. 15, 2011, pp. 1-6.

* cited by examiner

PROTECTING PRIVACY IN GROUP COMMUNICATIONS

CROSS-REFERENCE TO RELATED APPLICATIONS

The present application claims the benefit of co-pending U.S. provisional application No. 60/859,678, filed on Nov. 17, 2006, the entire disclosure of which is incorporated by reference as if set forth in its entirety herein.

TECHNICAL FIELD

The invention generally relates to systems and methods for protecting user privacy in group communications. More particularly, the invention relates to methods and systems for protecting user privacy by controlling the blocking and unblocking of other users.

BACKGROUND

Various implementations of remote communications technologies, such as instant messaging, voice messaging, and video conferencing, to name just a few examples, allow users to communicate with each other on a one-to-one basis, in a group, or both. A group typically is a defined list of people who participate in the communication. For example, in the context of instant messaging, a user may specify a group, and instantiate a communications session among the members of that group. The group may be previously defined, defined by an administrator, defined at a server, defined at the time that a communications session is initiated, or some combination of the foregoing.

Exemplary features of an instant messaging service are described, for example, in publicly available documents from the Open Mobile Alliance, such as WV-041 Features and Functions (OMA-IMPS-WV-Features-Functions-V1_2-20050125-A), available from: <http://www.openmobilealliance.org/release_program/imps_v1_2_1.html>.

In some implementations, users may make use of a presence service to allow users to see who is available for communication, also referred to as being "on-line." By providing users with information about who is "present" on the system, a user may select one or more of those users who are on-line for a communications session. A communications service, typically via client software, communicates to a first user information describing whether a second user is available or unavailable, for example, whether the user is on-line or off-line. This may be determined by any suitable technique, including without limitation a manual configuration on the part of the second user, whether the second user has a client that is connected to a server, the status or activity level of the second user's client, and so on.

The first user may "subscribe" to presence information about the second user, for example by including the second user in a friends list, including them in a group, or in some other manner. Once subscribed to the second user's presence information, the first user's client software will provide to the user updates about the presence of the second user. Depending on configuration, the first user's client may poll the server-, the second user's client, or both for presence information, or a server may do so, or the second user's client may periodically provide presence information to a server, or some combination of the foregoing. It may be that a server to which the second user's client connects makes determinations about the presence of the second user based on other interaction with the client of the second user. In any case, the information is communicated to the first user's client.

In some services, users can prevent certain other users from having access to their presence information by "blocking" them. Presence updates for a blocking user are not delivered to a "blocked" user. Thus, even if a blocked user has requested presence information regarding a blocking user, the blocked user will not be provided with that information.

In many systems, in order to preserve the privacy of blocking users, especially if they are not accessing the service anonymously, blocked users are not told that they have been blocked. In some such systems, the service may provide presence updates to the blocked user's client that indicate to the blocked user that the blocking user is off-line, even if the blocking user is on-line. This mechanism is sometimes referred to as "polite blocking."

SUMMARY OF THE INVENTION

In some circumstances, a blocking user and a blocked user may both be invited by a third user to participate in a group communication, for example, as part of a group service. If the blocked user and the blocking user both accept the invitation, they will both be active in the communication, and the blocked user will be aware that the blocking user is on-line. If during such a group communication, however, the blocked user still receives presence updates from the service that indicates that the blocking user is off-line, then the blocked user may notice the discrepancy. The blocked user may realize that he has been blocked by the blocking user, violating the privacy of the blocking user.

In general, in one aspect, the invention relates to a method for protecting the privacy of a user of a communication system that includes enabling a first user to block a second user so that the first user generally appears to the second user to be unavailable. The method includes allowing a third user to establish a group using a group service that includes the first user and the second user. The group service may be any sort of group service that involves communication among three or more users. For example, the group may be an instant message group, voice chat, conference call, video conference, or any other suitable group communication.

The method includes determining whether the first user and the second user are participating in the group. This may be determined by a user's client, a server, a presence server, a group server, or otherwise. If it is determined that the blocking user and the blocked user are both participating in the group, then the actual presence information of the blocking user is provided to the blocked user. This allows the blocked user to be presented with information in the system in which the blocking user has blocked the user that is consistent with the information that the blocked user obtains otherwise within the group service, and so protects the privacy of the blocking user's decision to block the blocked user.

When the blocking user or the blocked user leaves the group, the system may resume communicating to the blocked user that the first user is unavailable. This may happen immediately upon the exit of one of the blocked user or the blocking user from the group, or in some embodiments blocking of presence information may resume after a delay time period, preferably a short time period. The delay may be a constant time, or may be variable, arbitrarily variable or based on other data including but not limited to the identities of the users, previous delays, random input, a delay generation algorithm, or some combination of one or more of these with each other and/or other data.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

Figure 1:
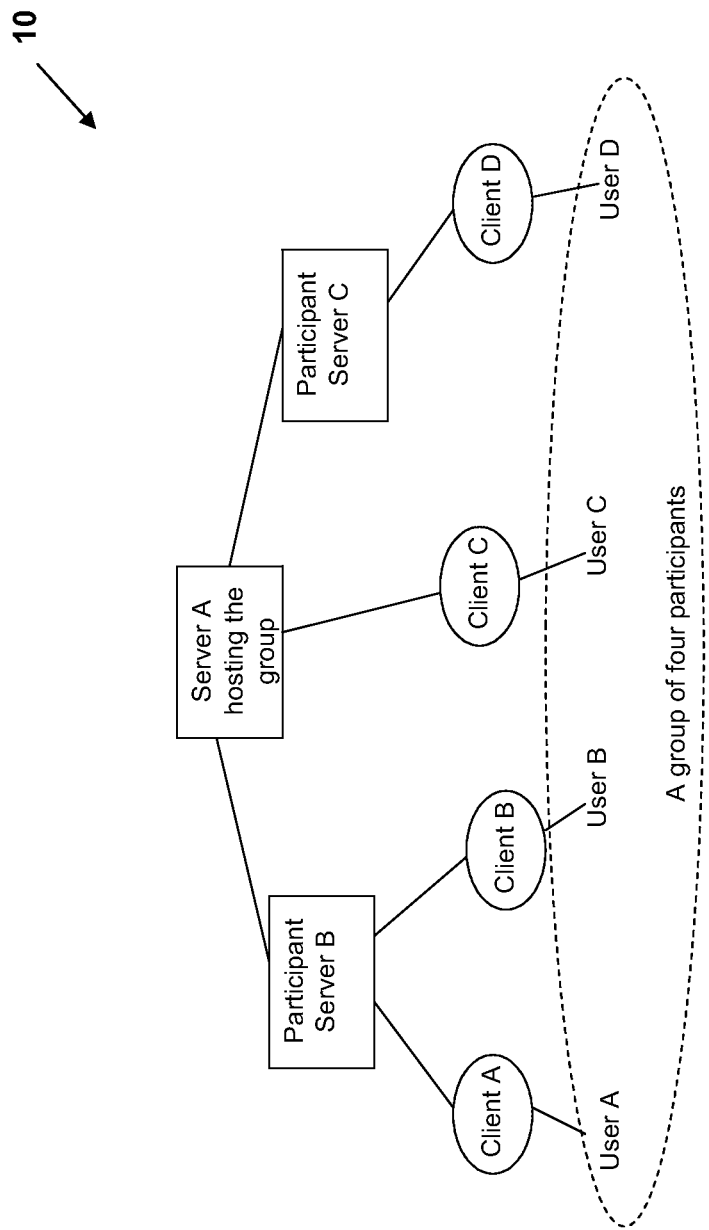
FIG. 1 is a block diagram of an exemplary embodiment.

Referring to FIG. 1, in a simplified exemplary embodiment of a communications system 10, a server A hosts a group of four participants, User A, User B, User C, User D. The communications system may be any suitable communications system that allows User A, User B, User C, and User D to communicate with each other. For example, the communications system 10 may be an instant messaging system, voice messaging system, voice conference system, video conferencing system, workgroup system or some other sort of communications system. There may be one, two, or more services that are available to a user.

Some systems provide "group" services. As one example, a user may be able to create and manage chat groups, including defining if the group is open to everyone or closed to members of a user-defined list; defining the role of each member of the group (e.g., regular members, moderators, administrators), with the different roles having different management privileges; assigning a name, topic, and welcome note to the group, expulsing members from the group; defining whether or not private messaging (whispering) is allowed in the group, and specifying whether or not the group may be searchable in open directories.

A user thus may participate in chat groups created by others, including private groups created by other users and public groups created by an administrator or service provider. For both private and public groups, it is possible that users may be able to subscribe to group changes, and receive notifications when changes happen; assume a screen name to not divulge their true identity or use their true identity; join and/or leave the group; exchange messages within the group; invite users to join the group and join the group automatically upon connecting to the service.

Typically, for most group services, a user can see which other users are currently joined in the group (and so are "online" within the scope of the group), and a user can join a group using his true identity, and so he can allow other users to recognize who it is that is online.

As shown in the figure, each user operates their respective client software. Client A and Client B are in communication with participation server B, client C is in communication with server A, and client D is in communication with participant server C. Participant server B and participant server C each communicates with server A. It should be understood that this server architecture is demonstrative, and that there might be any number or configuration of servers, clients, users, and so on in a particular implementation. Likewise, each of the clients could be in communication with the same server or with different servers. Different services may be provided by the same or different servers.

The provision of the same or different types of services, in which each service provides information about whether a user is available, and in which at least one of the services provides blocking, may create a conflict. For example, a first user who has blocked a second user in one service may find himself in a common group with that second user in another service, and the second service may reveal presence information for the first user. Even in the same service, it may be possible for a user that has blocked another user from one-on-one communication to find himself in a group communications session with the other blocked user.

In this demonstrative example, the server hosting a group service, server A, is notified of users entering and leaving group communication. For example, in the example of an instant messaging system, server A is a server for handing instant messaging communication sessions. The server may send a notification to all participants in the group conversation as to when group members have entered and left the group.

It may be, however, that a new group service participant has blocked one or more of the other group participants, or a new participant may be blocked by one or more of the other group participants. In each case, the system may take appropriate action to protect the privacy of the blocking user, so as to hide from the blocked user the fact that he or she has been blocked by the blocking user.

If the new group participant is blocked by one or more of the other group participants, the server serving the participants checks whether at least one of the group participants has blocked the new participant entering the group. If so, then the server for the blocking participant stops sending updates that the blocking participant is unavailable, and starts sending accurate presence updates (i.e., that the blocking user is on-line) until the blocked or blocking user leaves the group (or until the blocking user decides to unblock the blocked user). Once the blocking user or the blocked user has left the group, the server of the blocking user may then resume sending notifications to the blocked user indicating that the blocking user is unavailable even if the blocking user is on-line. The server may wait a short time afterward, which may be a fixed time, an arbitrary time, a predetermined time, or any combination thereof, to resume sending information that the blocking user is unavailable.

For example, if User A has blocked User D, and User D subscribes to or requests presence information about User A, User D will generally receive presence information that indicates that User A is unavailable. If User D joins a group communications session with User A, User B, and User C, during the communications session, User D will be informed by (in this example) Server B directly, or via Server C, that User A is on-line. Accurate presence data about User A will continue to be communicated to User D until User A or User D leaves the group. At that time, or some time thereafter, Server B will resume sending User D inaccurate presence information concerning User A even when User A is online. The change from blocked to temporarily unblocked may be initiated by Client A, by Server B, or otherwise.

Similarly, if a new participant in a group communication session is blocking other group participants, the server for the new participant will determine this as the new participant enters the group. The blocking of presence information will be temporarily interrupted for the duration of the communications session, and blocked users are then notified that the entering user is available.

For example, if User A has blocked User D, User D will generally receive presence information that indicates that User A is unavailable. Thus, if User D is participating in the group, prior to the arrival of User A, User D will be informed that User A is not online. When User A joins the group, and so long as User A is in the group, however, User D will be informed by Server B directly, or via Server C, that User A is on-line.

It should be understood that if the blocking user is immediately shown as unavailable whenever one of the blocked user and the blocking user leaves the group, the blocked user may deduce that the blocking user has blocked her. In order to hide the resumption of the transmission of inaccurate presence information, the system may send incorrect information after a period of time has passed. The time period may be a constant, fixed time or may vary, (e.g., randomly), to further hide the fact that the blocked user has been blocked.

Message Blocking

In some embodiments, blocking may include not only blocking presence information, but may also include blocking messages transmitted to a blocking user. When message blocking is implemented, for example, messages intended for a user may be blocked and not delivered. The blocked user typically is not informed that the message intended for the blocking user was blocked.

The simultaneous blocking of presence information to a blocked user and messages from a blocked user is frequently employed to prevent a user from having any contact with a particular user in a communications system.

In some embodiments, the system operates as described above, in that presence information is selectively communicated when a blocking user and blocked user are in the same group, but message blocking is maintained even when they are in the same group, such that no messages from the blocked user are communicated to the blocking user.

In some embodiments, however, both presence blocking and message blocking are temporarily disabled to some extent when the blocking and blocked users are participating in the same group. When the blocking and the blocked users are both in the same group, the blocked user will see the true presence status of the blocking user, and the blocked user will be able to send messages to the blocking user in the context of the common communications group that they both are participating in. For example, the blocked user may post a message to the whole group, which the blocking user will see because he is a member of the group. In these embodiments, however, even while they are both participating in a group, if the blocked user attempts to send a message directly to the blocking user, for instance by initiating a one-to-one communication with the blocking user outside the context of the group service, the server or client of the blocking user may prevent the message from being delivered to the blocking user. This may be accomplished without notifying the sender that the sender's message has not been delivered.

In some embodiments, when temporarily unblocked, the blocked user may be allowed to initiate one-to-one sessions with the blocked user, but only when they are part of the same group, and for the duration of the remaining sessions. After any joint sessions are complete (and possibly for some time period thereafter) the blocked user would again be presented with presence information indicating that the blocking user is unavailable, and messages to the blocking user would be blocked.

Thus, although the true presence status of the blocking user may be communicated to the blocked user when they have both joined the common group, the blocking user may still be prevented from receiving messages directly from the blocked user. Such embodiments selectively decouple message blocking from presence blocking, because the purpose of unblocking for presence is to prevent the blocked user from learning that she has been blocked, not to facilitate unwanted communication.

Figure 2:
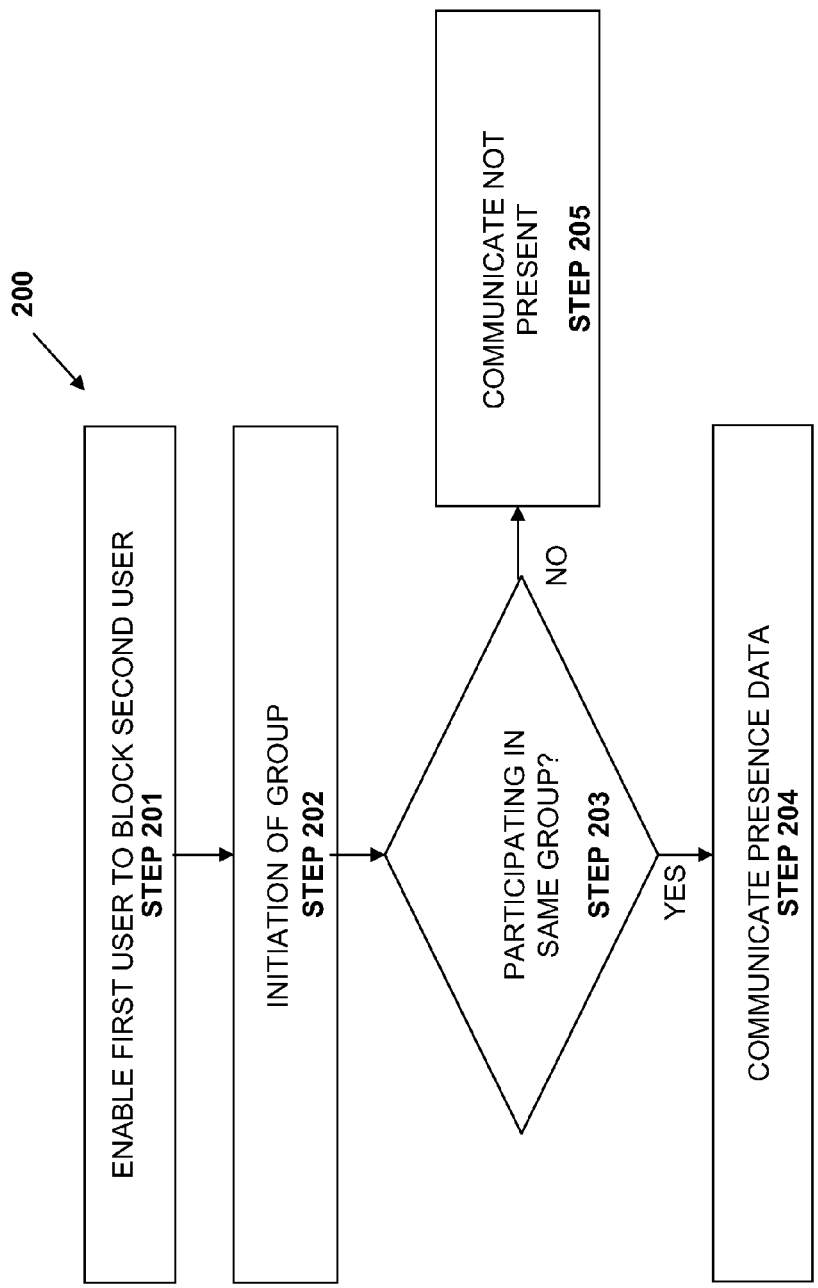
FIG. 2 is a flowchart of an embodiment of a method.

Referring to FIG. 2, in general, in one aspect, a method for protecting the privacy of a user of a communication system includes enabling a first user to block a second user so that the first user generally appears to the second user to be unavailable (STEP 201).

The method also includes allowing a third user to establish a group that includes the first user and the second user (STEP 202). As mentioned, the group may be any sort of group that involves communication among three or more users. For example, the group may be an instant message group, voice chat, conference call, and so on.

The method includes determining whether the first user and the second user are participating in the same group (STEP 203). This may be determined by a user's client, a server, a presence server, a group server, or otherwise. This typically is determined at the time that a user joins a group communications session, and a server determines whether the user is a blocking user or a blocked user with respect to any of the other users in the group.

As mentioned, if both the blocking user and the blocked user are participating in the group, then the actual presence information of the blocking user is provided to the blocked user (STEP 204) for the time that they are both participating in the communications session. This allows the blocked user to be presented with information that is consistent with the blocked user's experience while in the group.

If the blocking user or the blocked user leaves the group, the system will communicate to the blocked user that the blocking user is unavailable (STEP 205). As mentioned above, this may happen immediately upon the exit of one of the blocked user and the blocking user from the group, or it may happen after a delay time period. The delay may be a constant time, or may be arbitrarily variable or based on other data including but not limited to the identities of the users, previous delays, random input, a delay generation algorithm, or some combination of one or more of these with each other and/or other data.

The blocking may be presence blocking and message blocking, or may only be presence blocking and message blocking remains unaffected. Message blocking, for example, may be disabled only with respect to communication outside the group communications session.

The method may be implemented, for example, in computer software, and instructions for implementing the method may be provided on a computer-readable medium, such as a memory, hard drive, compact disc, floppy disk, and so on.

Figure 3:
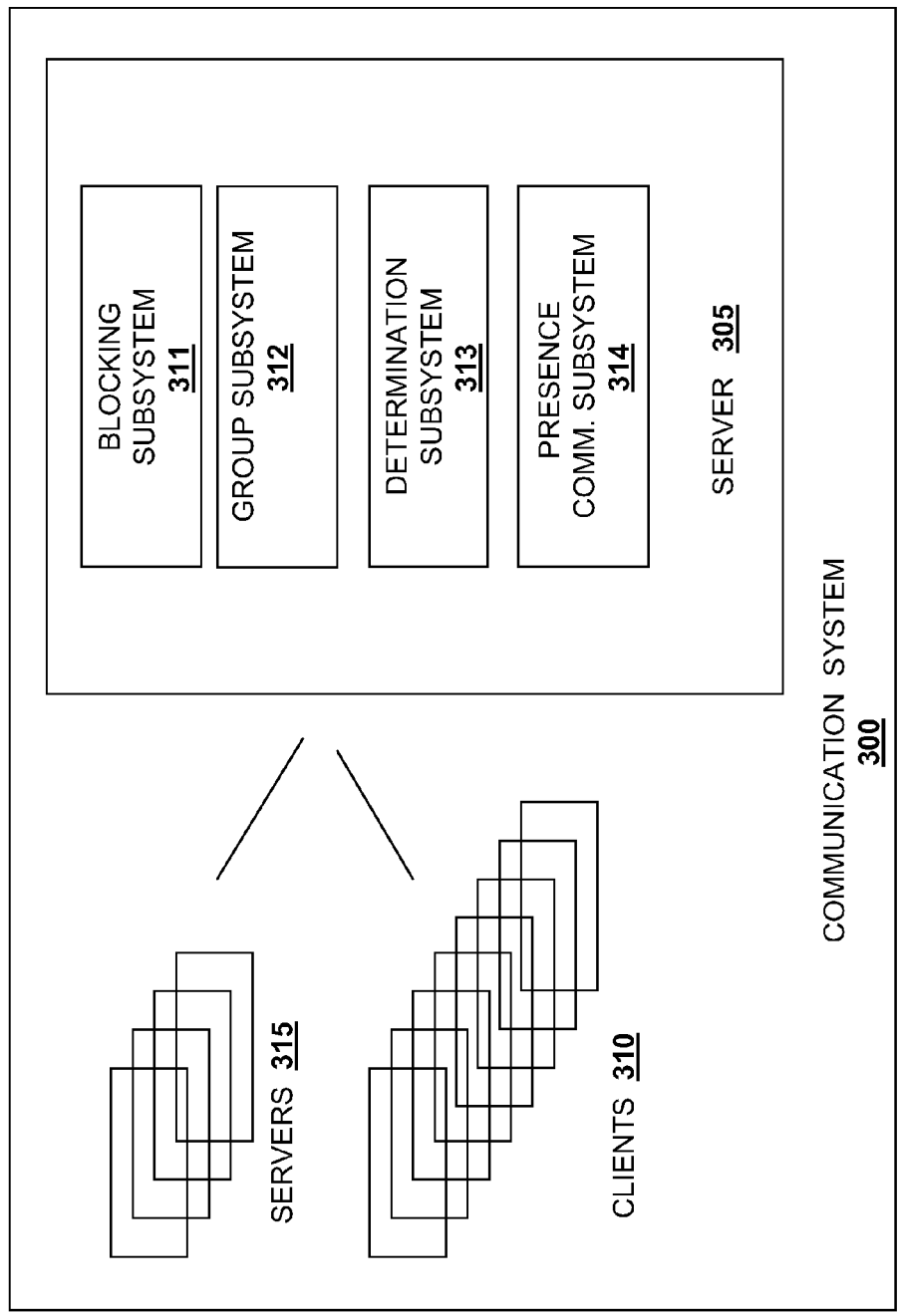
FIG. 3 is a block diagram of an embodiment of the invention.

Referring to FIG. 3, a communication system 300 according to an embodiment of the invention includes servers 305, 315, which in this embodiment may be in communication with each other and with clients 310 to implement the functionality described here. As mentioned, the server may implement any sort of communications technology, including without limitation instant messaging, voice chat, push-to-talk, conference calling, and so on, and may be implemented over any sort of communications technology, including without limitation wired and/or wireless networks.

The system includes a blocking subsystem 311 for enabling a first user to block a second user so that the first user generally appears to the second user to be unavailable. The system also includes a group communication subsystem 312 for allowing a third user to establish a group that includes the first user and the second user.

The system includes a determination subsystem 313 for determining whether the first user and the second user are participating in the same group. This may be determined by a user's client, a server, a presence server, a group server, or otherwise. This typically is determined at the time that a user joins a group communications session, and a server determines whether the user is a blocking user or a blocked user with respect to any of the other users in the group.

The system also includes a presence communication subsystem 314 that, if both the blocking user and the blocked user are participating in the group, communicates the actual presence information of the blocking user to the blocked user for the time that they are both participating in the communications session (and in some embodiments, for a time period after). This allows the blocked user to be presented with information that is consistent with the blocked user's experience while in the group. If the blocking user or the blocked user leaves the group, the presence communication subsystem 314 will communicate to the blocked user that the blocking user is unavailable. As mentioned above, this may happen immediately upon the exit of one of the blocked user and the blocking user from the group, or it may happen after a delay time period. The delay may be a constant time, or may be arbitrarily variable or based on other data including but not limited to the identities of the users, previous delays, random input, a delay generation algorithm, or some combination of one or more of these with each other and/or other data.

The blocking may be presence blocking and message blocking, or may only be presence blocking, and message blocking remains unaffected. Message blocking may be disabled, for example, only with respect to communication outside the group communications session.

It should be understood that each of these subsystems may be implemented by software modules, special-purpose hardware, or any other suitable fashion, and, if software, that they all may be implemented on the same computer, or can be distributed individually or in groups among different computers. There may be multiple instances of some or each of the subsystems, and they may be operated in any suitable manner.

In general, in various embodiments, the servers 305, 315 may include software running on a general-purpose computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH OS X operating system from Apple Computer of Cupertino, Calif., and various varieties of Unix, such as SUN SOLARIS from SUN MICROSYSTEMS, and GNU/Linux from RED HAT, INC. of Durham, N.C. (and others). The servers 305, 315 and clients 310 could also be implemented on such hardware as a smart or dumb terminal, network computer, wireless device, wireless telephone, information appliance, workstation, minicomputer, mainframe computer, or other computing device that is operated as a general purpose computer or a special purpose hardware device used solely for serving the purposes described here.

It should be understood generally that the systems and methods described here are exemplary, and that other variations within the spirit and scope of the invention are included.

What is claimed is:

1. A non-transitory computer-readable storage medium comprising instructions which, when executed by a computer processor, cause the processor to perform a method comprising:

enabling a first user to appear to a second user as being generally unavailable, irrespective of actual availability data of the first user, while exposing the actual availability data of the first user to a third user;

while said enabling is in effect, allowing the third user to establish a group that includes both the first user and the second user; and automatically and temporarily interrupting said enabling by communicating the actual availability data about the first user to the second user while the first user and the second user are both participating in the group and for a period of time thereafter determined by a delay generation algorithm, and afterwards communicating to the second user that the first user is unavailable.

2. The storage medium of claim 1, wherein messages from the second user communicated to the group are viewable by the first user, but messages from the second user communicated to the first user are blocked.

3. The storage medium of claim 1, wherein the period of time may vary for each time that the first user and the second user participate in the group.

4. The storage medium of claim 1, wherein said enabling the first user to appear to the second user as being generally unavailable, comprises blocking at least one of the second user's presence information and messages.

5. The storage medium of claim 1, further comprising allowing the second user to initiate a one-to-one session with the first user while the first user and second user are part of the group.

6. The storage medium of claim 1, further comprising determining whether the first user and the second user are participating in the same group, prior to said automatically communicating.

7. A computer-based apparatus, comprising:
a blocking subsystem that controls a computer processor to enable a first user to appear to a second user as being generally unavailable, irrespective of actual availability data of the first user, while exposing the actual availability data of the first user to a third user;
a group communication subsystem that controls the processor to enable the third user to establish a group that includes both the first user and the second user, while said blocking subsystem is making the first user appear to the second user as being generally unavailable; and
a presence communication subsystem that controls the processor to automatically and temporarily interrupt said blocking subsystem from making the first user appear to the second user as being generally unavailable, by communicating the actual availability data about the first user to the second user when the first user and the second user are both participating in the group and for a period of time thereafter determined by a delay generation algorithm, and afterwards communicating to the second user that the first user is unavailable.

8. The apparatus of claim 7, wherein said privacy subsystem further controls the processor to make messages from the second user communicated to the group available to the first user, but to block messages from the second user communicated to the first user.

9. The apparatus of claim 7, wherein the period of time may vary each time that the first user and the second user participate in the group.

10. The apparatus of claim 7, wherein said blocking subsystem further controls the processor to block at least one of the second user's presence information and messages, while said blocking subsystem is making the first user appear to the second user as being generally unavailable.

11. The apparatus of claim 7, wherein said blocking subsystem further controls the processor to enable the second user to initiate a one-to-one session with the first user while the first user and second user are part of the group.

12. The apparatus of claim 7, further comprising a determination subsystem that controls the processor to determine whether the first user and the second user are participating in the same group.

\* \* \* \* \*